US010003628B2

(12) United States Patent
Chang

(10) Patent No.: US 10,003,628 B2
(45) Date of Patent: Jun. 19, 2018

(54) MANAGING TASK OBJECT STATE UTILIZING A RELIABLE MESSAGING MODEL

(71) Applicant: International Business Machines Corporation, Armonk, NY (US)

(72) Inventor: Ku G. Chang, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 13/872,118

(22) Filed: Apr. 28, 2013

(65) Prior Publication Data

US 2014/0289558 A1    Sep. 25, 2014

Related U.S. Application Data

(63) Continuation of application No. 13/848,836, filed on Mar. 22, 2013.

(51) Int. Cl.
*H04L 29/08* (2006.01)
*G06Q 10/06* (2012.01)
*G06F 11/07* (2006.01)
*G06F 9/54* (2006.01)

(52) U.S. Cl.
CPC .......... *H04L 67/02* (2013.01); *G06F 11/0751* (2013.01); *G06Q 10/06* (2013.01); *H04L 67/10* (2013.01); *G06F 9/547* (2013.01)

(58) Field of Classification Search
CPC ......... H04L 67/02; H04L 67/10; G06Q 10/10; G06Q 40/00; G06Q 30/04; G06Q 10/06; G06F 11/0751
See application file for complete search history.

(56) References Cited

U.S. PATENT DOCUMENTS

| 7,359,919 | B2* | 4/2008 | Cohen ..................... H04L 29/06 |
| 7,562,147 | B1 | 7/2009 | Cohen | |
| 2003/0177259 | A1* | 9/2003 | Wookey .................. H04L 29/06 |
| | | | | 709/237 |
| 2006/0168132 | A1* | 7/2006 | Bunter et al. ................. 709/219 |
| 2007/0043827 | A1* | 2/2007 | Banerjee ....................... 709/218 |
| 2008/0263221 | A1* | 10/2008 | Xiao et al. .................... 709/237 |
| 2008/0288956 | A1* | 11/2008 | Videlov ......................... 719/313 |
| 2012/0170445 | A1 | 7/2012 | Perumanam et al. | |

* cited by examiner

*Primary Examiner* — Chirag R Patel
(74) *Attorney, Agent, or Firm* — Steven M. Greenberg, Esq.; CRGO Law

(57) ABSTRACT

Embodiments of the present invention address deficiencies of the art in respect to task object state management for workflow management systems and provide a novel and non-obvious method, system and computer program product for managing task object state utilizing a reliable messaging model. In an embodiment of the invention, a method for managing task object state utilizing a reliable messaging model is provided. The method includes transmitting according to a reliable messaging protocol a launch request for a task object in a workflow over a computer communications network to a remote server. The method also includes determining from the reliable messaging protocol whether or not the launch request has failed. Finally, the method includes responding to a determination that the launch request has failed, by transmitting a test request to the remote server using a protocol other than the reliable messaging protocol and setting a state of the task object as failed only if the remote server responds to the test request.

5 Claims, 1 Drawing Sheet

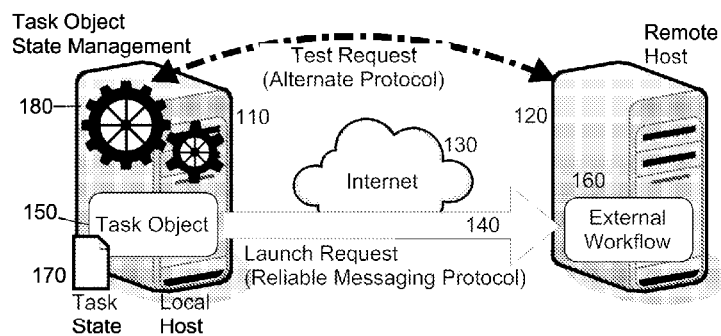
FIG. 1
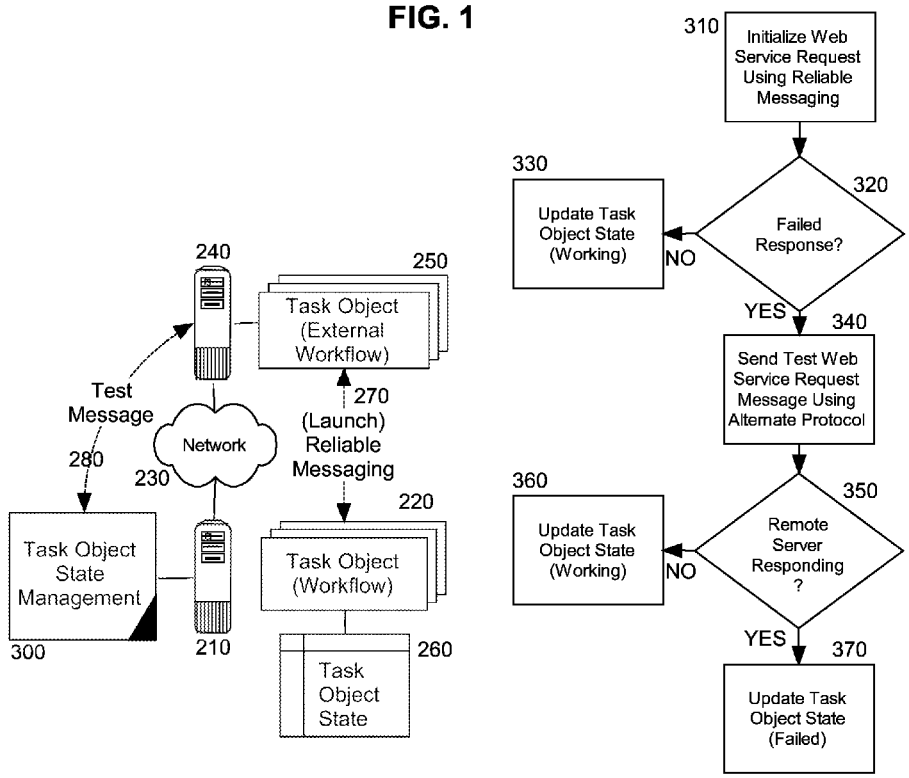
FIG. 2
FIG. 3

MANAGING TASK OBJECT STATE UTILIZING A RELIABLE MESSAGING MODEL

CROSS-REFERENCE TO RELATED APPLICATIONS

This application claims priority to U.S. patent application Ser. No. 13/848,836, currently pending, filed Mar. 22, 2013, the entirety of which are incorporated herein by reference.

BACKGROUND OF THE INVENTION

Field of the Invention

The present invention relates to external workflow launching and more particularly to launching an external workflow using reliable messaging.

Description of the Related Art

A workflow consists of a sequence of concatenated steps. A workflow management system is a computer system that manages and defines a series of tasks within an organization as concatenated steps in order to produce a final outcome or outcomes. In operation, workflow management systems allow end users to define in computer memory different workflows for different types of jobs or processes. At each stage in the workflow, one individual or group of individuals can be assigned to a specific task. Once the task is complete, the workflow management system ensures that the individuals or group of individuals responsible for the next task are notified and receive the data requisite to execute the next defined stage of the process.

Workflow management systems have been implemented according to the services oriented architecture (SOA). In SOA, different programmatic tasks are implemented in separable programmatic logic that can be disposed and executed in different containers about a computer communications network. The programmatic tasks can be indexed within a directory and accessed on demand through the issuance of a network request to access the functionality or encapsulated data of the tasks. In fact, entire workflows can be disposed externally from other workflows. In this way, a workflow can be defined as a sequence of invoking different componentized tasks that further may be distributed so as to render the workflow highly available.

For workflow management systems implemented in distributed fashion, such as according to a Web services paradigm or SOA, communications between programmatic objects can be of paramount importance—particularly when invoking an external workflow from a contemporaneously executing task in a workflow. Reliable messaging refers to a protocol that allows object messages to be reliably delivered between distributed applications in the presence of software component, system, or network failures. As one example, "WS-ReliableMessaging" is a reliable messaging protocol implementation that operates upon simple object access protocol (SOAP) messages.

In a workflow management system, it is desirable that the state of a task object also reflects the state of the workflow associated with the task object. Further, when launching an external workflow using reliable messaging, the result of the attempt to launch the workflow can be either successful in that the workflow has started, or failed in that the workflow did not start. Yet, the reason for failure to launch an external workflow can be ambiguous in that the failure state does not indicate whether or not the failure is recoverable or non-recoverable. Yet, for recoverable errors, the task object state should be set to "Working" since the reliable messaging framework will try to re-deliver the request when remote server returns online. Conversely, for non-recoverable errors, the object task should be set to "Failed".

BRIEF SUMMARY OF THE INVENTION

Embodiments of the present invention address deficiencies of the art in respect to task object state management for workflow management systems and provide a novel and non-obvious method, system and computer program product for managing task object state utilizing a reliable messaging model. In an embodiment of the invention, a method for managing task object state utilizing a reliable messaging model is provided. The method includes transmitting according to a reliable messaging protocol a launch request for a task object in a workflow over a computer communications network to a remote server. The method also includes determining from the reliable messaging protocol whether or not the launch request has failed. Finally, the method includes responding to a determination that the launch request has failed, by transmitting a test request to the remote server using a protocol other than the reliable messaging protocol and setting a state of the task object as failed only if the remote server responds to the test request.

In another embodiment of the invention, a workflow management data processing system is configured for managing task object state utilizing a reliable messaging model. The system includes a local server with memory and at least one processor, and a remote server also with memory and at least one processor, the local and remote servers being communicatively coupled to one another over a computer communications network. The system further includes a workflow of task objects executing in the memory of the local server, each of the task objects including a task object state. Finally, the system includes a task object state management module executing in the memory of the local server. The module includes program code enabled to determine from a reliable messaging protocol used to transmit a launch request for one of the task objects to the remote server, whether or not the launch request has failed, and, responsive to a determination that the launch request has failed, to transmit a test request to the remote server using a protocol other than the reliable messaging protocol and to set a state of the task object as failed only if the remote server responds to the test request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for managing task object state utilizing a reliable messaging model;

FIG. 2 is a schematic illustration of a workflow management data processing system configured for managing task object state utilizing a reliable messaging model; and, FIG. 3 is a flow chart illustrating a process for managing task object state utilizing a reliable messaging model.

DETAILED DESCRIPTION OF THE INVENTION

Embodiments of the invention provide for managing task object state utilizing a reliable messaging model. In accordance with an embodiment of the invention, a request to launch an external workflow from a task object can be transmitted to a remote workflow server using a reliable messaging protocol. The result of the request can be monitored and, in response to a failure determination of the reliable messaging protocol, a separate request using a protocol that differs from the reliable messaging protocol can be issued to the remote workflow server. If the separate request is successful, a failure state of the request to launch the external workflow can be recorded as the task object state. Otherwise, a working state can be recorded for the task object state for the request to launch the external workflow.

In further illustration, FIG. 1 pictorially shows a process for managing task object state utilizing a reliable messaging model. As shown in FIG. 1, a task object 150 within a local host 110 can issue a launch request 140 to launch an external workflow 160 according to a reliable messaging protocol, for example WS-ReliableMessaging. The external workflow 160 can be disposed remotely from the local host 110 within a remote host 120 that has been communicatively coupled to the local host 110 by way of a global computer communications network 130 such as the global Internet.

Task object statement management logic 180 can monitor the reliable messaging result of the launch request 140 and, in response to a failure condition, the logic 180 can transmit to the remote host 120 a test request utilizing an alternative protocol such as the hypertext transfer protocol (HTTP). To the extent the test request fails to produce a response indicating the unavailability of the remote host 120, the task state 170 of the task object 150 can be marked "Working" as the reliable messaging protocol will automatically retry the launch request 140. Otherwise, if the test request produces a response indicating the availability of the remote host 120, the task state 170 of the task object 150 can be marked "Failed" since the failure reported by reliable messaging bears no relationship to the availability of the remote host 120.

The process described in connection with FIG. 1 can be implemented within a workflow management data processing system. In yet further illustration, FIG. 2 schematically shows a workflow management data processing system configured for managing task object state utilizing a reliable messaging model. The system can include a local server 210 configured for communicative coupling to a remote server 240 over computer communications network 230. Each of the local and remote servers 210, 240 can include memory and at least one processor and each can include a configuration to execute one or more software applications including an application server hosting the execution of task objects 220 of a defined workflow. Each task object 220 in the workflow can include a task object state 260. The task object state 260 can include an indication of whether or not an external workflow 250 has been successfully launched responsive to a launch request 270 that utilizes a reliable messaging protocol. Of import, a task object statement management module 300 can execute in the memory of the local host 210.

The module 300 can include program code that when executed in the local host 210, is enabled to respond to detecting a failure condition for a launch request message 270 sent to a remote host 240 for an external workflow 250 by transmitting a test message 280 to the remote host 240 utilizing an alternate protocol known to be supported by the remote host 240. If the test message 280 is successfully communicated indicating the operational status of the remote host 240, the task object state 260 can be set to a failure state for the launch request 270. Otherwise, the task object state 260 can be set to a working state for the launch request 270 pending a retry of the launch request 270 according to the reliable messaging protocol.

In even yet further illustration of the operation of the task object state management module 300, FIG. 3 is a flow chart illustrating a process for managing task object state utilizing a reliable messaging model. Beginning in block 310, a Web service request can be transmitted from a task object according to a reliable messaging protocol to launch an external workflow in a remote server over a computer communications network. In decision block 320, it can be determined whether or not the request has failed according to a reliable messaging protocol response. If not, in block 330, a state of the task object can be updated to a working state. Otherwise, the process can continue through block 340.

In block 340, a test Web service request, for example using the HTTP protocol, can be transmitted to the remote server. In decision block 350, it can be determined whether or not the remote server is responding to requests based upon the test Web service request. If not, in block 360 the task object state can be set to a working state. Otherwise, in block 370 the task object state can be set to a failed state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method for managing task object state utilizing a reliable messaging model, the method comprising:
    transmitting according to a reliable messaging protocol a launch request for a task object in a workflow over a computer communications network to a remote server;
    determining from the reliable messaging protocol whether or not the launch request has failed; and,
    responsive to a determination that the launch request has failed, transmitting a test request to the remote server using a protocol other than the reliable messaging protocol and setting a state of the task object as failed only upon determining that the remote server responds to the test request.

2. The method of claim 1, wherein the reliable messaging protocol is WS-ReliableMessaging.

3. The method of claim 1, wherein the launch request is a request to launch an external workflow.

4. The method of claim 1, wherein the protocol of the test request is the hypertext transfer protocol (HTTP).

5. The method of claim 1, further comprising setting a state of the task object to working upon determining that the remote server fails to respond to the test request.

* * * * *